March 4, 1958    R. C. SWEETING    2,825,083
DEVICE FOR CLEANING A SOLDERING IRON
Filed June 17, 1953
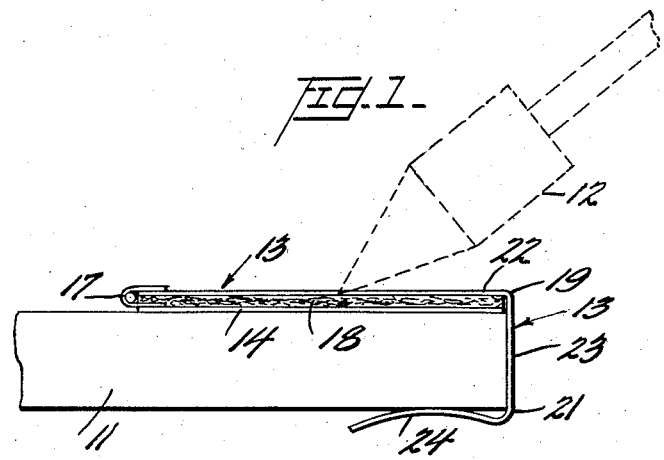
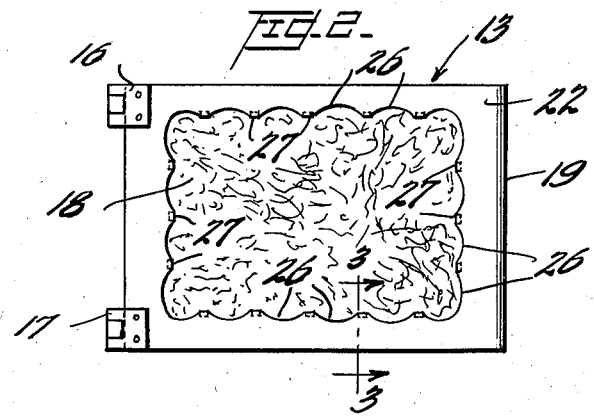
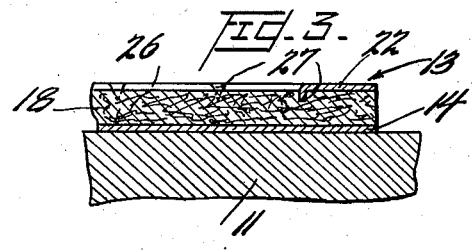
INVENTOR
Robert C. Sweeting,
BY A. C. Schwarz, Jr.
ATTORNEY

United States Patent Office 2,825,083
Patented Mar. 4, 1958

2,825,083

DEVICE FOR CLEANING A SOLDERING IRON

Robert C. Sweeting, Greensboro, N. C., assignor to Western Electric Company, Incorporated, New York, N. Y., a corporation of New York Application June 17, 1953, Serial No. 362,203

5 Claims. (Cl. 15—210)

This invention pertains to a device for cleaning a soldering iron and in particular to such a device that is mounted on a work bench.

In removing excess solder or foreign matter from a soldering iron, a flick given to the soldering iron has often been found undesirable because of personal injury or property damages caused by a spray of hot solder. Also the method of cleaning the soldering iron by using a wiping rag held in the hand proved inconvenient because both hands must be used and there is a possibility of personal injury.

A further method of cleaning or dressing the soldering iron by wiping it on the edge of the work bench is also undesirable, as it causes damage to the work bench.

It is an object of this invention to provide a simple, efficient and convenient device that can be easily clamped on a work bench to serve as a soldering iron cleaning device, a bench protector, and a rest for the soldering iron when dressing the surface thereof.

A complete understanding of the invention may be obtained from the following detail description taken in conjunction with the accompanying drawings wherein, Fig. 1 is a side view of the device clamped on a work bench with a soldering iron positioned above the device;

Fig. 2 is a plan view of the device shown in Fig. 1; and

Fig. 3 is a partial section taken along line 3—3 of Fig. 2.

Referring now to the drawings, wherein like reference numerals designate the same parts throughout the several views, the soldering iron cleaning device is shown clamped to a work bench 11 and a soldering iron 12 is illustrated to indicate a possible location of use thereof.

The device is provided with two cooperating sheet metal plates 13 and 14 connected together by a pair of hinges 16 and 17. The sheet metal backing plate 14 is a solid flat sheet of twelve gage steel and provides a backing support for a wiping pad 18 that is made of cloth, asbestos or any other suitable cleaning material. The metal plate 13 is also made of twelve gage steel and has substantially right angle bends at corners 19 and 21. The sheet metal plate 13 comprises a frame portion 22, a downwardly extending portion 23 for positioning adjacent the leading edge of the bench 11, and a resilient clamping portion 24 for positioning adjacent the underside of the bench 11. The curved clamping portion 24 of the plate 13 forms a resilient member that presses against the underside of the work bench 11 and in conjunction with other elements of the device holds the device thereon. The wiping pad 18 tends to force the plates 13 and 14 apart and this exerts a pressure against the work bench 11 through the plate 14 which in turn enables the resilient portion 24 to hold the device more firmly in place.

The plate 13 has an aperture with an irregular edge 26 and downwardly extending prongs 27 that bite into the wiping pad 18 and hold it in place. The irregular edge 26 is formed in any suitable manner, such as by a series of adjacent round punched holes. Projections left by the series of adjacent round punched holes are turned down to form the prongs 27. The prongs 27, the frame portion 22, the downwardly extending portion 23, and the clamping portion 24, in this embodiment, are formed from the single sheet metal plate 13.

It is apparent from the drawings that the cleaning or wiping pad 18 is placed in the device before it is clamped on the work bench 11. Prior to mounting the device on the work bench 11 or upon removing the device from the work bench 11, the lower plate 14 is free to swing away from the upper frame portion 22 on the hinges 16 and 17, and then the wiping pad 18 can be attached to or removed from the prongs 27. In order to insert the wiping pad 18, it is placed against the prongs 27 and forced thereon by pressing plates 13 and 14 together and the pad 18 is held in place by the action of the clamping portion 24 when the device is affixed to the work bench 11. The tension that secures the device to the work bench 11 is also regulated by the thickness of the wiping pad 18 placed between the plates 13 and 14.

The device serves several purposes when it is clamped on the work bench 11. An operator can remove any excess solder or dirt from the soldering iron 12 by wiping it on the pad 18; also, the operator, while dressing the soldering iron 12, can rest it on the corner 19; and further, the soldering iron 12, when not in use, can be placed on the frame portion 22 thereby protecting the work bench 11.

It is to be understood that while the embodiment disclosed and described herein is a preferred one, the invention is susceptible to many different forms, and that other instrumentalities may be substituted for those disclosed, and that various changes and modifications may be made without departing from the spirit and scope of this invention.

What is claimed is:

1. A device for mounting on a work bench for cleaning a soldering iron comprising a first metallic plate for positioning adjacent the top of said bench, a second metallic plate having three portions consisting of a first frame portion hingedly mounted on said first metallic plate to overlie said first plate, a plurality of spaced prongs secured to said first frame portion and extending downwardly therefrom, a second downwardly-extending portion perpendicular to said first frame portion for positioning adjacent the leading edge of said bench, a third resilient clamping portion substantially perpendicular to said second downwardly extending portion and extending in a direction to underlie the first plate for positioning adjacent the underside of said bench for holding said device on said bench, and a wiping pad interposed between said first metallic plate and said first frame portion and gripped by said plurality of prongs.

2. In a soldering iron cleaning device, a first flat sheet, a second metallic sheet having three portions consisting of a first portion having an irregular aperture therein, a plurality of downwardly extending prongs integral with said first portion at the edge of said irregular aperture, said first portion hingedly mounted to said first flat sheet to overlie said first sheet, a second downwardly extending portion integral with said first portion, and a third portion integral with said second portion and substantially parallel to said first portion for clamping said device to a work bench, said third portion extending in a direction to underlie the first sheet, and a wiping pad inserted between said first metallic sheet and said first portion and gripped by said downwardly extending prongs.

3. A fixed wiper device comprising a backing plate for positioning on a table top, a cleaning pad adjacent said backing plate, a frame hingedly mounted to said backing plate and contacting the cleaning pad, a plurality of prongs mounted on said frame and engaging said cleaning pad, and clamping means securing said frame to said table top for forcing said frame toward said backing plate for holding said cleaning pad therebetween.

4. A device for cleaning a soldering iron for use with a supporting means comprising a backing plate for positioning on said supporting means, a wiping pad adjacent said backing plate, a frame, downwardly extending prongs mounted on said frame for engaging said wiping pad, said frame hingedly mounted to said backing plate and contacting said wiping pad, and clamping means for forcing said frame toward said backing plate and securing said device to said supporting means.

5. A soldering iron cleaning device for use with supporting means, which device comprises a backing plate adjacent to supporting means, a pad adjacent to said backing plate for wiping said soldering iron, a frame pivotally secured to said backing plate adjacent to said pad, and clamping means urging said frame toward the supporting means so as to force the frame toward said backing plate for gripping said pad between the frame and the backing plate and securing said device to the supporting means.

References Cited in the file of this patent

UNITED STATES PATENTS

| | | |
|---|---|---|
| 1,426,632 | Hachmann | Aug. 22, 1922 |
| 1,482,399 | Inglis | Feb. 5, 1924 |
| 1,626,107 | Ullrich | Apr. 26, 1927 |
| 2,260,047 | Nelson | Oct. 21, 1941 |